Patented Mar. 20, 1945

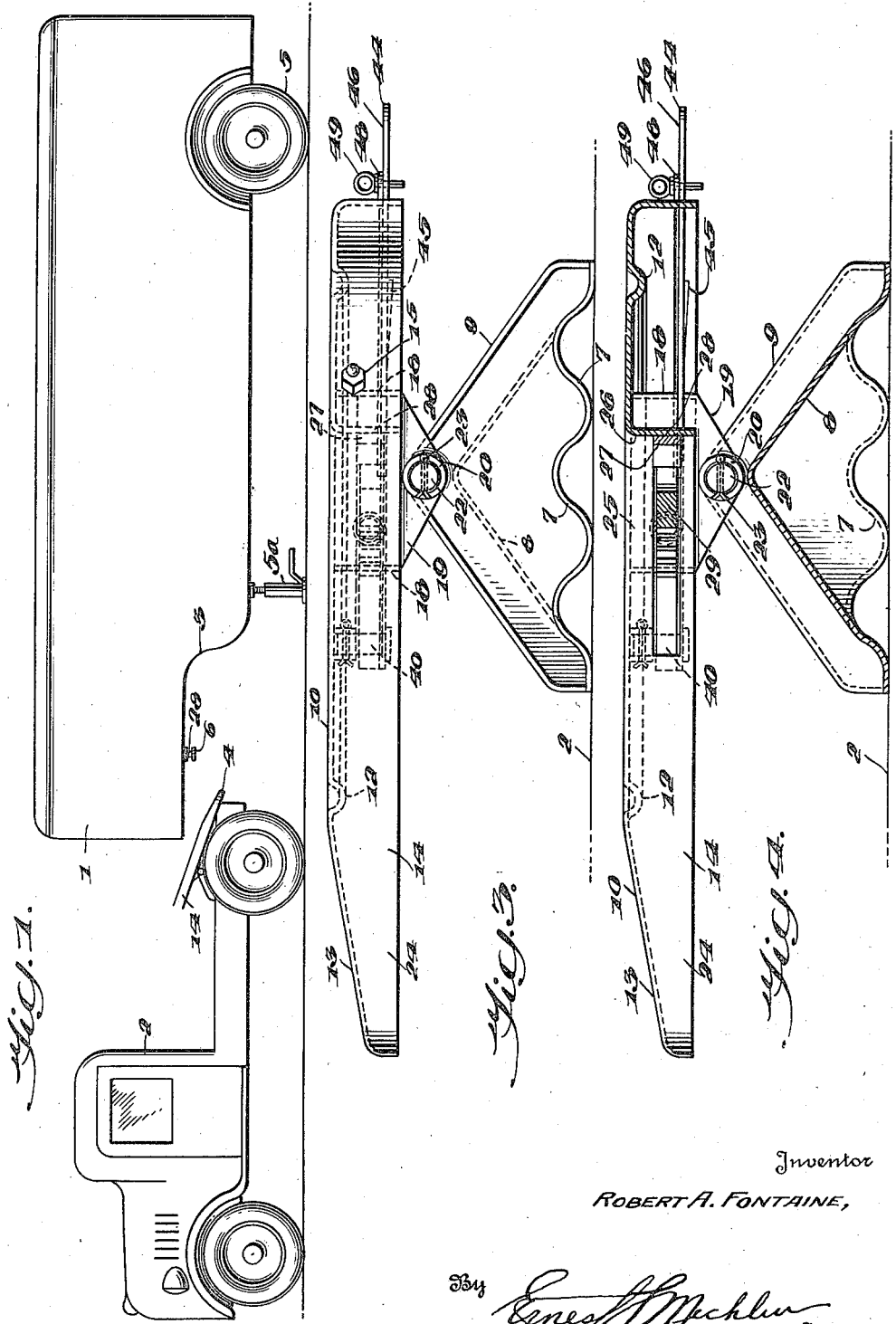

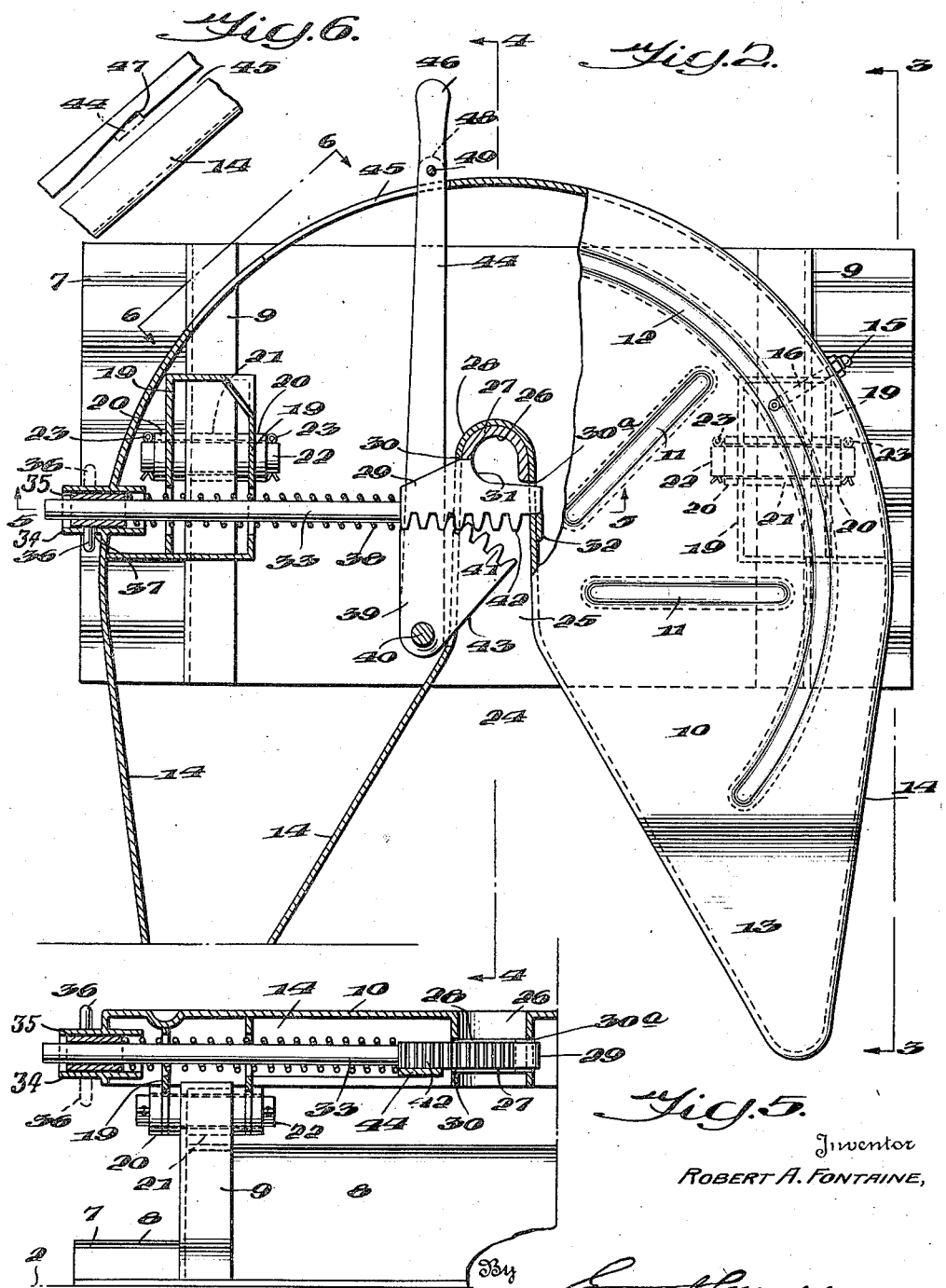

2,371,750

UNITED STATES PATENT OFFICE 2,371,750

COUPLING FOR TRUCKS AND TRAILERS

Robert A. Fontaine, Martinsville, Va.

Application February 9, 1944, Serial No. 521,697

8 Claims. (Cl. 280—33.1)

The invention pertains to a coupling for an automotive unit and more particularly to a type of coupling commonly termed a fifth wheel which forms a component of a connection between a power unit or truck and a trailer unit or detachable body.

An object of the invention is to provide a flexible truck-body connection with the connection being somewhat of the nature of a tight lock wherein only a pivotal movement of the fifth wheel is permitted and only a pivotal movement between the fifth wheel and a king pin of the trailer is also permitted.

Another object of the invention is the provision, in a fifth wheel, adapted to form a pivotal connection between a truck and body and wherein certain movable parts thereof may be preset to permit an automatic coupling of the truck and body.

A further object of the invention is the provision, in a power unit-trailer body connection, of a resilient means associated with and related to certain movable components of the connection so as to retain a king pin holding means in a normal king pin locking or engaging position.

The above and numerous other objects of the invention will become apparent from the succeeding description considered together with the accompanying drawings wherein an exemplified form of the invention is disclosed and wherein:

Figure 1 is a diagrammatic view of a power unit and trailer body embodying the present invention; the power unit and trailer body are shown in uncoupled or separated relationship so as to more clearly illustrate the respective parts of the automotive assemblage.

Figure 2 is an enlarged and partial plan view of a fifth wheel or truck-body coupling shown in Figure 1; a portion of this view being illustrated in horizontal section.

Figure 3 is an end view of the fifth wheel and taken along the lines 3—3 of Figure 2, looking in the direction of the arrows.

Figure 4 is a vertical cross sectional view taken along the lines 4—4 of Figure 2 and looking in the direction of the arrows.

Figure 5 is a vertical cross sectional view taken along the lines 5—5 of Figure 2 and looking in the direction of the arrows.

Figure 6 is a partial side elevational view taken along the lines 6—6 of Figure 2 and looking in the direction of the arrows.

Referring now in detail to the drawings, wherein like reference characters indicate like parts, the numeral 1 is employed to designate in a somewhat general manner, an automotive unit comprising a power unit, tractor or truck 2 and a trailer unit or cargo or lading carrying body 3 arranged to be connected or disconnected through the medium of a fifth wheel, flexible coupling or tilting table 4. As is commonly known, considerable time is consumed in loading and unloading the lading of the trailer body which is the main reason for arranging the fifth wheel so that the truck and trailer may be disconnected. By reason of this commonly known arrangement or expedient the trailer may be deposited at or taken to a designated station where it can be disconnected from the truck and the latter utilized in moving another trailer. For this reason, therefore, as well as because, generally, the trailer is provided with only a rear wheel support assemblage 5, pedestals, stands or legs 5a are disposed adjacent the forward extremity of the trailer body to support the overlying portion of the trailer in a substantially horizontal position and dispose a depending king pin 6 of the trailer body in position so as to be associated with the fifth wheel or tilting table.

The fifth wheel or truck carried portion of the truck-trailer connection comprises a base plate 7 arranged to be secured firmly to a truck or power unit and has for the purpose of adding strength or rigidity thereto convolutions or serrations 8 disposed in a transverse direction. Rising from the base plate in transverse spaced relation to one another is a pair of standards, brackets or supports 9 each of which is of inverted V configuration when considered in elevation and of substantial angle shape in cross section. Each standard has its free or lower extremities secured firmly to the base plate by means of welds (not shown) or any other desired means. Forming a part of the fifth wheel is a top or bearing plate, shield or cover 10 of pressed steel preferably as opposed to cast steel and being provided with substantially radially disposed reinforcing ribs 11 opening upwardly or outwardly so as to function not only as rigidifying means but also as lubricant receiving or holding wells or reservoirs. Adjacent the periphery of the top plate is an arcuate groove 12 which is formed and functions the same as the ribs 11. The rear portion 13 of the cover tapers gracefully or gradually downwardly from the plane of the rear portion thereof so as to present an incline or skid over which a bearing plate (not shown) on the trailer may ride or slide during a coupling or uncoupling action. The cover is provided with an integrally formed side, skirt or flange 14 depending from the main portion of the shield to rigidify the fifth wheel against stresses to which it will be subjected in service. Associated with the flange is a lubricating fitting or coupling 15 which leads to a conduit 16 disposed beneath the top plate and opening into the groove 12 so that a lubricating medium may be supplied to the groove. Depending from the cover or top plate is a pair of transversely spaced braces or brackets 17 each of which have an upper portion 18 of substantial box formation and presenting downwardly extending arms 19 to form hinging bearings 20. Each standard is likewise provided with a bushing or bearing 21 aligned vertically and horizontally with related hinged bearings and through which there is extended a hinging pin 22 locked at its respective ends by means of cotters 23 to prevent an unwarranted or accidental displacement thereof.

The fifth wheel is provided with a funnelled opening or mouth 24 defined by correspondingly disposed portions of the skirt or flange to function as a directing means for the king pin during the coupling operation of a truck and trailer. The fifth wheel mouth leads into a canal 25 forming a restricted area limiting the path of the king pin and which leads into or terminates in a socket 26. The socket is lined with a collar or bearing ring 27 secured to the associated arcuate portion 28 of the skirt or flange by any desired means, none of which are illustrated. The inner surface of the bearing ring is so formed that it is partially contiguous to or in surface bearing relation with a circular relief or neck 28 of the king pin 6 to be fitted closely thereby so that any buffing forces transmitted to the trailer by the truck are carried through the king pin and bearing ring. Also by reason of the bearing ring being positioned within the relief 28 any lifting forces tending to separate vertically a coupled truck or trailer will be arrested or overcome.

Means has been provided in the truck-trailer coupling so that a definite but removable lock will be presented at the juncture under immediate consideration and as exemplary of such a means a slidable rack 29 has a portion thereof projecting normally through accommodating apertures or orifices 30 and 30a respectively in the related portion of the skirt to bar or arrest the entrance into or exit from the socket. The thickness of the rack is such that it will neatly fit into the relief or neck 28 of the king pin and, accordingly, has an arcuate face or surface 31 contiguous or coradial with and arranged to surface contact a king pin. The free extremity of the rack which normally occupies the orifice 30a has, in close proximity thereto, a thrust bar 32 secured to the skirt and which, together with the related portion of the skirt, presents an appreciable bearing area for the rack in overcoming draft forces transmitted from the truck to the trailer. Extending horizontally or laterally from the rack is a guide bar or rod 33 projecting through the vertical plane of the periphery of the fifth wheel. The skirt, in the area of the intersecting rod, has formed thereon a nipple or tube 34 which desirably projects laterally from each side of the skirt; that is to say inwardly and outwardly thereof. The nipple, loosely fitted by and telescoping the rod, has disposed therein a removable rotatable means or bushing 35 forming a sliding support for the related or free extremity of the bar or rod so as to present a guideway for the rod during any reciprocal movement of the rack-rod assemblage. As indicated above, the bushing is removable in order to facilitate the assembly of the component parts and accordingly the bushing is provided with a single or oppositely disposed wings or fingers 36 fitting into accommodating grooves 37 to form a retaining means in the nature of a bayonet joint commonly known. Acting transversely of the fifth wheel is a resilient means or coil or helical spring 38 circumambient the rod or bar and bearing at its opposite ends against the rack and bushing respectively.

From the above, therefore, it will be noted that during assembly, the free end of the rod is threaded through the nipple a distance sufficiently to permit the rack to clear the overlying portion of the skirt at which time the rack is raised so as to be aligned with the orifices 30 and 30a when the rod-rack combination is then threaded into its normal illustrated position. The coil spring is then applied to the rod through the nipple and finally the bushing is inserted into the nipple and locked in place. It will be further noted that the resilient means tends to maintain the rack in an extended position in the path of a king pin.

Pivotally mounted on the under side of the top plate is a pinion means 39 or more correctly described as a segment of a pinion and retained in a predetermined position by means of a pivot pin or pintle 40. The pinion is provided with teeth 41 which mesh with teeth 42 of the rack and by reason of this arrangement any action or force imparted to the pinion will be reflected in the rack. The pinion has a portion thereof extending normally through the orifice 30 into the canal and this portion carries a surface 43 preferably disposed at an angle to the path of an entering king pin so that as a king pin is moved through the canal it will strike the surface 43 and pivot or urge the pinion about the pintle in a direction out of the canal. This pinion movement will cause the rack to be displaced laterally or horizontally, removing the barrier effect thereof and permitting the free entrance of the king pin into the socket. As soon as the king pin reaches a place of rest within the socket the holding effect exerted upon the rack has been removed and accordingly the energy stored up in the spring forces the rack to assume its normal illustrated position. By reason of this rack and pinion arrangement it will be noted that draft forces transmitted to the trailer from the power unit will also pass through the rack and pinion thereby shortening or lessening the bridging effect of the rack since it will be anchored against service stresses at both ends. This arrangement also relieves entirely the bar of any bending moments.

To effect an uncoupling action of the assemblage the pinion is provided with an integrally formed or firmly secured operating lever or handle 44 which is perpendicularly disposed to the rod and underlies, in supporting relation, the associated extremity of the rack. The handle extends from the interior of the fifth wheel through a slot 45 in the skirt and has a gripping means 46 disposed outwardly of the confines of the fifth wheel so that this gripping means may be grasped by an operator to actuate the rack out of king pin arresting position. The slot has, intermediate its ends, a shoulder 47 against which the operating handle may bear temporarily in presetting the rack-pinion assemblage preparatory to a coupling action of the truck and trailer. While the shoulder is not absolutely necessary for the successful operation of the mechanism it is, however, desirable in that the rack may be partially withdrawn from the canal. When the mechanism has been preset and the king pin engages the surface 43 of the pinion, a continued action on the part of the king pin will, as previously described, urge the pinion and rack further out of the way and when the rack is free to assume its normal position the operating handle will travel over the shoulder to allow a free unrestricted and full return stroke thereof. As a precautionary measure to safeguard against an accidental movement of the operating lever from its illustrated position there is provided a lug 48 outstanding from the skirt in overlapping relation with the operating handle and a removable pin 49 projects through the lug and handle to lock them together.

From the foregoing it will be noted that various changes and alterations may be made to the accompanying drawings and the description thereof without departing from within the spirit of the invention and scope of the appended claims.

I claim:

1. In a coupling for a truck and trailer body wherein a fifth wheel having a socket for the reception of a king pin is pivotally mounted on the truck; the combination of, a rack normally barring the entrance to said socket, means extending horizontally from said rack and projecting through a side of said fifth wheel, means interlocked with said side and telescoping said first named means, spring means interposed between and bearing in opposite directions against said rack and second named means, and pinion means intermeshed with said rack; said pinion means having a portion normally extending into said entrance to said socket and carrying a surface disposed at an angle to the path of a king pin entering said socket.

2. In a coupling for a truck and trailer body wherein a fifth wheel having a socket for the reception of a king pin is pivotally mounted on the truck; the combination of, a rack slidably associated with said fifth wheel and having a portion thereof normally extending through a passageway into said socket, rotatable means interlocked with a side of said wheel and spaced from said rack, a bar fixed to said rack and extending through said rotatable means, spring means circumambient said rod and urging said rotatable means and rack apart, pinion means pivotally connected to said fifth wheel and intermeshed with said rack, a surface carried by said pinion means and disposed normally in the path of a king pin entering said socket, and lever means secured to said pinion means and extending to the exterior of said fifth wheel.

3. In a coupling for a truck and trailer body wherein a fifth wheel having a socket for the reception of a king pin is pivotally mounted on the truck; the combination of, a rack slidingly associated with said fifth wheel and having a portion thereof normally extending through a passageway into said socket, a face on said rack adapted to surface contact said king pin, means removably associated with said fifth wheel in spaced relation to said rack, resilient means interposed between said removably associated means and rack for urging them apart, pinion means pivotally carried by said fifth wheel and intermeshed with said rack, and a plane surface carried by said pinion adapted to be engaged by said king pin upon entering said passageway so as to temporarily displace said rack.

4. In a coupling for a truck and trailer body wherein a fifth wheel having a socket for the reception of a king pin is pivotally mounted on the truck; the combination of, a rack slidably related to said fifth wheel below a top plate thereof, an arcuate face on said rack adapted to surface contact said king pin, means removably associated with said fifth wheel and removed from said rack and first named means, a coil spring retained in position by said last named means and urging said rack and said first named means apart, and pinion means pivotally connected to said fifth wheel and intermeshed with said rack; said pinion means having a surface extending normally into the path of said king pin for engagement by the latter during a coupling action of said truck and trailer body.

5. In a coupling for a truck and trailer body wherein a fifth wheel having a socket for the reception of a king pin is pivotally mounted on the truck; the combination of, a rack movably related to said fifth wheel, an arcuate surface carried by said rack and adapted to surface contact said king pin, spring means acting against said rack for urging the latter in one direction, a pinion pivotally connected to said fifth wheel and intermeshing with said rack, a surface carried by said pinion and disposed normally in the path of said king pin so that a contact between said pinion surface and king pin will displace said rack and pinion from normal position, lever means for actuating said rack and pinion, and holding means carried by said fifth wheel for engagement by said lever means for retaining said lever means at a point intermediate the extremities of its travel.

6. In a coupling for a truck and trailer body wherein a fifth wheel having a socket for the reception of a king pin is pivotally mounted on a truck; the combination of, a rack movably related to said fifth wheel, a surface carried by said rack and adapted to contact said king pin, spring means acting against said rack for urging the latter in one direction, a pinion pivotally connected to said fifth wheel and intermeshing with said rack, a surface carried by said pinion and disposed normally in the path of said king pin so that a contact between said pinion surface and king pin will displace said rack and pinion from normal position, and lever means for actuating said rack and pinion.

7. In a coupling for a truck and trailer body wherein a fifth wheel having a socket for the reception of a king pin is pivotally mounted on the truck; the combination of, a rack slidably associated with said fifth wheel, a surface carried by said rack and adapted to contact said king pin, resilient means acting against said rack for urging the latter in one direction, a pinion pivotally connected to said fifth wheel and intermeshing with said rack, a surface carried by said pinion and disposed normally in the path of said king pin so that a contact between said pinion surface and king pin will displace said rack and pinion from normal position, and means for actuating said rack and pinion.

8. In a coupling for a truck and trailer body wherein a fifth wheel having a socket for the reception of a king pin is pivotally mounted on the truck; the combination of, a rack associated with said fifth wheel and having a portion thereof normally extending through a passageway into said socket to bear against said fifth wheel, a surface carried by said rack and adapted to contact said king pin, means acting against said rack for holding the latter normally in said passageway, a pinion connected to said fifth wheel and intermeshing with said rack, a surface carried by said pinion and disposed normally in said passageway into said socket so that a contact between said pinion surface and king pin will move said rack and pinion out of said passageway sufficiently to permit the entrance of said king pin into said socket.

ROBERT A. FONTAINE.